Patented June 12, 1951

2,556,959

UNITED STATES PATENT OFFICE 2,556,959

DENTIFRICE AND METHOD OF PREPARING SAME

Robert V. Connelly, University City, Mo., assignor to Monsanto Chemical Company, St. Louis, Mo., a corporation of Delaware No Drawing. Application April 20, 1949, Serial No. 88,689

23 Claims. (Cl. 167—93)

The present invention relates to a dentifrice base containing dicalcium phosphate and an alkaline earth compound selected from the group consisting of the oxide, hydroxide and glycerophosphate of calcium.

An object of the invention is to provide a novel dentifrice base which, when incorporated with conventional ingredients in the preparation of sudsing dental creams, imparts to the latter improved deaerating properties.

A further object is to provide a sudsing dental cream which may be deaerated at a greatly accelerated rate, thus substantially increasing the production capacity of conventional dental cream compounding units and thereby markedly reducing manufacturing costs.

A still further object is to provide an improved method of deaerating sudsing dental creams.

Other objects and advantages will be apparent to those skilled in the art as the description of the invention proceeds.

In the compounding of sudsing dental creams containing dicalcium phosphate, thickening agents, flavoring and other conventional ingredients, the presence of detergents causes excessive frothing or sudsing with the result that low density creams of variable consistency and texture are obtained. To overcome this undesirable result, it is customary to deaerate the cream before it is tubed. This is accomplished in part by spontaneous deaeration which takes place as a result of merely allowing the blended cream to stand without further mixing. The deaeration is then completed by introducing the cream into a tank wherein it is subjected to reduced pressure for a period of time sufficient to yield a product having an apparent density desired, as for example, of at least 1.5.

With sudsing dental creams containing dicalcium phosphate dihydrate, it requires more than an hour and a half to obtain satisfactory deaeration by the above method. This is objectionable as prolonged deaeration reduces production capacity and thereby greatly adds to manufacturing cost.

I have made the surprising discovery that if from about 0.05% to about 0.60% by weight of an alkaline earth compound selected from the group consisting of the oxide, hydroxide and glycerophosphate of calcium is blended with dicalcium phosphate, a dentifrice base is obtained which, when incorporated in sudsing dental creams, results in a product of markedly improved deaerating properties.

Any convenient method of blending the above materials may be employed, but it is preferably carried out in the manner hereinafter described. In the following description, hydrated lime will be used for the purpose of illustration and it is to be understood that equivalent quantities of the other alkaline earth compounds mentioned above may be substituted for the hydrated lime.

A premix is initially prepared by mixing 6 parts of hydrated lime with approximately 30 parts of dicalcium phosphate dihydrate in a suitable mixer, whereupon the resulting product is thoroughly blended with 3000 parts of dicalcium phosphate dihydrate. Another 3000 parts of the dihydrate is added and the mixing continued for 30 minutes or longer until the above materials are thoroughly and uniformly blended together. The product thus obtained is then in a form in which it may be compounded with conventional dentifrice ingredients in the preparation of dental creams.

The effect of hydrated lime and calcium glycerophosphate additions on the deaerating properties of dental creams containing same will be demonstrated by the experimental data hereinafter presented.

Following the preferred blending procedure, mixtures of dicalcium phosphate dihydrate and 0%, 0.05%, 0.10%, 0.15%, 0.20% and 0.4% by weight of $Ca(OH)_2$; and 0.5% by weight of calcium glycerophosphate were prepared. These mixtures were blended with the conventional ingredients employed in the preparation of a sudsing dental cream and then deaerated in the following manner:

After the paste was prepared, it was allowed to stand at atmospheric pressure for 7½ minutes, whereupon it was stirred for 45 seconds and allowed to stand for an additional 7½ minutes. At the end of this operation, the paste was again stirred for 45 seconds and a density determination made. This was repeated three times, thus giving three density determinations in a total elapsed time of about 45 minutes.

Twenty-nine inches of vacuum was then applied and the mixture stirred continuously for a period of 15 minutes. Then the vacuum was broken and a density determination made. This vacuum treatment was repeated for a total of three times, thus giving three density determinations on the vacuum treated material.

The above procedure required a total elapsed time of about 1½ hours. The following results were obtained.

*Effect of time on rate of deaeration as shown by apparent specific gravity*

|  | Atmospheric Pressure | | | | Vacuum 29" | | |
| --- | --- | --- | --- | --- | --- | --- | --- |
| Min | 0 | 15 | 20 | 45 | 60 | 75 | 90 |
| Per Cent Ca(OH)₂: | | | | | | | |
| 0 | .68 | .68 | .68 | .68 | (¹) | | |
| .05 | .66 | .69 | .91 | 1.11 | 1.48 | 1.50 | 1.58 |
| .10 | .66 | .96 | 1.28 | 1.30 | 1.50 | 1.56 | |
| .15 | .69 | .95 | 1.03 | 1.49 | 1.52 | 1.52 | 1.54 |
| .20 | .63 | .87 | 1.08 | 1.27 | 1.59 | | |
| .40 | .64 | .66 | .80 | .99 | 1.54 | 1.56 | |
| Per Cent Calcium Glycerophosphate: | | | | | | | |
| .50 | .81 | 1.06 | 1.17 | 1.27 | 1.50 | 1.51 | 1.55 |

¹ When vacuum is applied, the paste containing no Ca(OH)₂ foams up to such an extent that a vacuum cannot be obtained, therefore, no values have been obtained on this sample.

The above data clearly indicate that a blend of dicalcium phosphate dihydrate and lime or calcium glycerophosphate effects a very marked decrease in the amount of time required to deaerate the dental cream to the desired density. This is a surprising result since numerous other calcium compounds are unsuitable for the above purpose. As evidence of this fact, reference is made to the following table wherein mixtures of dicalcium phosphate dihydrate containing the indicated amount of calcium salt were used in the preparation of a sudsing dental cream, and the resulting product subjected to the deaerating test hereinbefore described. The results obtained are given in the following table.

*Effect of time on rate of deaeration as shown by apparent specific gravity*

|  | Atmospheric Pressure | | | | Vacuum 29" |
| --- | --- | --- | --- | --- | --- |
| Min | 0 | 15 | 30 | 45 | (¹) |
| Per Cent Calcium salt: | | | | | |
| Calcium citrate, 0.5% | 0.64 | 0.64 | 0.65 | 0.70 | (¹) |
| Calcium nitrate, 0.5% | 0.74 | 0.72 | 0.72 | 0.72 | (¹) |
| Calcium lactate, 0.5% | 0.71 | 0.71 | 0.71 | 0.70 | (¹) |
| Tetracalcium pyrophosphate, 0.5% | 0.71 | 0.71 | 0.72 | 0.72 | (¹) |
| Calcium chloride, 0.5% | 0.62 | 0.65 | 0.71 | 0.73 | (¹) |
| Calcium sodium pyrophosphate, 1.0% | 0.64 | 0.66 | 0.72 | 0.79 | (¹) |
| Calcium sodium pyrophosphate, 2.0% | 0.67 | 0.67 | 0.71 | 0.75 | (¹) |
| Calcium sodium pyrophosphate, 3.0% | 0.66 | 0.66 | 0.69 | 0.72 | (¹) |

¹ When vacuum is applied, the paste containing no Ca(OH)₂ foams up to such an extent that a vacuum cannot be obtained, therefore, no values have been obtained on this sample.

The above table demonstrates that the above calcium salts have little, if any, effect on the time required to deaerate sudsing dentifrices.

As indicated above, the alkaline earth compound is employed in the dentifrice base in an amount corresponding to about 0.05% to about 0.6% by weight of the dicalcium phosphate dihydrate and within this range about 0.1% is preferred. The above proportions are critical since the desired result is not obtained by using the above compounds in quantities falling outside the above limits.

The dicalcium phosphate employed in the dentifrice base is substantially free of monocalcium phosphate. It may be used in the anhydrous, hydrated or stabilized form, but the last mentioned form is preferred. By stabilized dicalcium phosphate is meant the product disclosed and claimed in Patent 2,287,699 to Henry V. Moss and Maurice G. Kramer, which patent is assigned to Monsanto Chemical Company and is incorporated by reference in the instant application.

The following are illustrative examples of dental creams including the dentifrice bases of the present invention.

*Example I*

| | Percent |
| --- | --- |
| Polishing base: dicalcium phosphate dihydrate | 35–55 |
| Elixir: glycerine 55% to 75% concentration | 40–62 |
| Stabilizers: gums, Irish moss, methyl cellulose and equivalent materials | 0.2–0.6 |
| Sudsing agent: alkylarylsulfonates, higher alkyl sulfates of at least 8 carbon atoms, sulfated and sulfonated esters, etc. | 1–5 |
| Flavoring | 0.5–1.5 |
| Preservatives: saccharin, benzoic acid, sodium benzoate and other well known equivalent materials | 0.04–0.1 |
| Alkaline earth compound: calcium oxide, calcium hydroxide or calcium glycerophosphate | 0.05–0.6 |

*Example II*

| | Parts |
| --- | --- |
| Dicalcium phosphate dihydrate stabilized containing 0.1% Ca(OH)₂ | 47.55 |
| Glycerine U. S. P. | 33.16 |
| Water, distilled | 14.32 |
| Gum tragacanth | .20 |
| Gum karaya | .20 |
| Sudsing agent | 3.32 |
| Soluble saccharin | .11 |
| Benzoic acid | .04 |
| Flavor | 1.10 |

*Example III*

| | Parts |
| --- | --- |
| Dicalcium phosphate dihydrate stabilized containing .5% calcium glycerophosphate | 47.55 |
| Glycerine U. S. P. | 33.16 |
| Water, distilled | 14.32 |
| Gum tragacanth | .20 |
| Gum karaya | .20 |
| Sudsing agent | 3.32 |
| Soluble saccharin | .11 |
| Benzoic acid | .04 |
| Flavor | 1.10 |

The dental creams illustrated in the foregoing examples are characterized by possessing an accelerated deaeration rate as compared with the same compositions which exclude calcium oxide, calcium hydroxide or calcium glycerophosphate.

The above dental creams are prepared in the manner hereinafter described.

The glycerine solution is introduced into a sigmoid blade type mixer of 1.5 liter capacity. While stirring, the gums are slowly added to the solution and the stirring continued until they are uniformly dispersed therein. 10 milliliters of boiling water containing the saccharin and benzoic acid is added gradually and the stirring continued until the gums are hydrated, which operation generally takes from 5 to 7 minutes. A hot solution of 3.5 milliliters of water and the sudsing agent is then added slowly and the resulting mixture stirred until it has a smooth appearance; this usually requires about 5 minutes. To the resulting product, dicalcium phosphate dihydrate is added and mixed for 1 hour, whereupon a vacuum of about 29 inches is applied and the mixing continued until the dental cream is of the desired density. Thereafter, the flavoring is introduced and the mixing continued for an additional 5 minutes.

In carrying out the deaerating operation in accordance with the present invention, it is preferred to prepare the premix of dicalcium phosphate and the alkaline earth compound and then add the mixture to the dental cream batch as optimum results are thus obtained. However, it is within the scope of the invention to add these components separately and then subject the dental cream to deaeration.

The present invention is not limited to the compositions disclosed in the specific examples but is applicable to any and all sudsing dentifrices including dicalcium phosphate which is substantially free of monocalcium phosphate.

What I claim is:

1. A dentifrice base for use in sudsing dentifrice compositions comprising dicalcium phosphate and about 0.05% to about 0.6% by weight of an alkaline earth compound selected from the group consisting of the oxide, hydroxide and glycerophosphate of calcium.

2. A dentifrice base for use in sudsing dentifrice compositions comprising dicalcium phosphate dihydrate and about 0.05% to about 0.6% by weight of an alkaline earth compound selected from the group consisting of the oxide, hydroxide and glycerophosphate of calcium.

3. A dentrifrice base for use in sudsing dentifrice compositions comprising stabilized dicalcium phosphate dihydrate and about 0.05% to about 0.6% by weight of an alkaline earth compound selected from the group consisting of the oxide, hydroxide and glycerophosphate of calcium.

4. A dentifrice base for use in sudsing dentifrice compositions in accordance with claim 3 wherein hydrated lime is the alkaline earth compound employed.

5. A dentifrice base for use in sudsing dentifrice compositions in accordance with claim 3 wherein calcium glycerophosphate is the alkaline earth compound employed.

6. A dentifrice base for use in sudsing dentifrice compositions comprising dicalcium phosphate dihydrate and about 0.1% by weight of an alkaline earth compound selected from the group consisting of the oxide, hydroxide and glycerophosphate of calcium.

7. A sudsing dental cream of accelerated deaeration rate comprising dicalcium phosphate, a synthetic organic sudsing detergent and dentifrice ingredients, said sudsing dental cream having added thereto from about 0.05% to about 0.6% by weight based on dicalcium phosphate of an alkaline earth compound selected from the group consisting of the oxide, hydroxide and glycerophosphate of calcium, said sudsing detergent being selected from the group consisting of sulfonated and sulfated organic compounds.

8. In the method of compounding sudsing dental creams containing a synthetic organic sudsing detergent wherein the components thereof are mixed together and deaerated by stirring while subjecting same to reduced pressure, the improvement which comprises adding thereto a mixture of dicalcium phosphate and about 0.05% to about 0.6% by weight of an alkaline earth compound selected from the group consisting of the oxide, hydroxide and glycerophosphate of calcium, said sudsing detergent being selected from the group consisting of sulfonated and sulfated organic compounds.

9. In the method of compounding sudsing dental creams containing a synthetic organic sudsing detergent wherein the components are mixed together and deaerated by stirring while subjecting same to reduced pressure, the improvement which comprises adding thereto a mixture of dicalcium phosphate and about 0.05% to about 0.6% by weight of an alkaline earth compound selected from the group consisting of the oxide, hydroxide and glycerophosphate of calcium, said sudsing detergent being a sulfonated organic compound.

10. In the method of compounding sudsing dental creams containing a synthetic organic sudsing detergent wherein the components are mixed together and deaerated by stirring while subjecting same to reduced pressure, the improvement which comprises adding thereto a mixture of dicalcium phosphate and about 0.05% to about 0.6% by weight of an alkaline earth compound selected from the group consisting of the oxide, hydroxide and glycerophosphate of calcium, said sudsing detergent being a sulfated organic compound.

11. In the method of compounding sudsing dental creams containing a synthetic organic sudsing detergent wherein the components are mixed together and deaerated by stirring while subjecting same to reduced pressure, the improvement which comprises adding thereto a mixture of dicalcium phosphate and about 0.05% to about 0.6% by weight of an alkaline earth compound selected from the group consisting of the oxide, hydroxide and glycerophosphate of calcium, said sudsing detergent being an alkylaryl sulfonate.

12. In the method of compounding sudsing dental creams containing a synthetic organic sudsing detergent wherein the components are mixed together and deaerated by stirring while subjecting same to reduced pressure, the improvement which comprises adding thereto a mixture of dicalcium phosphate and about 0.05% to about 0.6% by weight of an alkaline earth compound selected from the group consisting of the oxide, hydroxide and glycerophosphate of calcium, said sudsing detergent being an alkyl sulfate having at least 8 carbon atoms.

13. In the method of compounding sudsing dental creams containing a synthetic organic sudsing detergent wherein the components are mixed together and deaerated by stirring while subjecting same to reduced pressure, the improvement which comprises adding thereto a mixture of dicalcium phosphate and about 0.05% to about 0.6% by weight of an alkaline earth compound selected from the group consisting of the oxide, hydroxide and glycerophosphate of calcium, said sudsing detergent being a sulfonated organic ester.

14. In the method of compounding sudsing dental creams containing a synthetic organic sudsing detergent wherein the components are mixed together and deaerated by stirring while subjecting same to reduced pressure, the improvement which comprises adding thereto a mixture of dicalcium phosphate and about 0.05% to about 0.6% by weight of an alkaline earth compound selected from the group consisting of the oxide, hydroxide and glycerophosphate of calcium, said sudsing detergent being a sulfated organic ester.

15. A sudsing dental cream of accelerated deaeration rate comprising dicalcium phosphate, a sulfonated organic sudsing detergent and dentifrice ingredients, said sudsing dental cream having added thereto from about 0.05% to about 0.6% by weight based on dicalcium phosphate of an alkaline earth compound selected from the group consisting of the oxide, hydroxide and glycerophosphate of calcium.

16. A sudsing dental cream of accelerated deaeration rate comprising dicalcium phosphate, a sulfated organic sudsing detergent and dentifrice ingredients, said sudsing dental cream having added thereto from about 0.05% to about 0.6% by weight based on dicalcium phosphate of an alkaline earth compound selected from the group consisting of the oxide, hydroxide and glycerophosphate of calcium.

17. A sudsing dental cream of accelerated deaeration rate comprising dicalcium phosphate, a synthetic organic sudsing detergent and dentifrice ingredients, said sudsing dental cream having added thereto from about 0.05% to about 0.6% by weight based on dicalcium phosphate of an alkaline earth compound selected from the group consisting of the oxide, hydroxide and glycerophosphate of calcium, said sudsing detergent being an alkylaryl sulfonate.

18. A sudsing dental cream of accelerated deaeration rate comprising dicalcium phosphate, a synthetic organic sudsing detergent and dentifrice ingredients, said sudsing dental cream having added thereto from about 0.05% to about 0.6% by weight based on dicalcium phosphate of an alkaline earth compound selected from the group consisting of the oxide, hydroxide and glycerophosphate of calcium, said sudsing detergent being an alkyl sulfate having at least 8 carbon atoms.

19. A sudsing dental cream of accelerated deaeration rate comprising dicalcium phosphate, a synthetic organic sudsing detergent and dentifrice ingredients, said sudsing dental cream having added thereto from about 0.05% to about 0.6% by weight based on dicalcium phosphate of an alkaline earth compound selected from the group consisting of the oxide, hydroxide and glycerophosphate of calcium, said sudsing detergent being a sulfonated organic ester.

20. A sudsing dental cream of accelerated deaeration rate comprising dicalcium phosphate, a synthetic organic sudsing detergent and dentifrice ingredients, said sudsing dental cream having added thereto from about 0.05% to about 0.6% by weight based on dicalcium phosphate of an alkaline earth compound selected from the group consisting of the oxide, hydroxide and glycerophosphate of calcium, said sudsing detergent being a sulfated organic ester.

21. A sudsing dental cream of accelerated deaeration rate having substantially the following composition:

| Ingredient | Per cent |
|---|---|
| Dicalcium phosphate dihydrate | 35–55 |
| Glycerine (55%–75% concentration) | 40–62 |
| Gums, Irish moss, methyl cellulose and equivalent materials | 0.2–0.6 |
| An alkyl aryl sulfonate detergent | 1–5 |
| Flavoring | 0.5–1.5 |
| Preservatives | 0.04–0.1 |
| A compound selected from the group consisting of calcium oxide, calcium hydroxide and calcium glycerophosphate | 0.05–0.6 |

22. A sudsing dental cream of accelerated deaerating rate having substantially the following composition:

| Ingredient | Per cent |
|---|---|
| Dicalcium phosphate dihydrate (stabilized) containing 0.1% Ca(OH)$_2$ | 47.55 |
| Glycerine U. S. P. | 33.16 |
| Distilled water | 14.32 |
| Gum tragacanth | .20 |
| Gum karaya | .20 |
| An alkyl sulfate detergent containing at least 8 carbon atoms | 3.32 |
| Soluble saccharin | .11 |
| Benzoic acid | .04 |
| Flavor | 1.10 |

23. A sudsing dental cream of accelerated deaerating rate having substantially the following composition:

| Ingredient | Per cent |
|---|---|
| Dicalcium phosphate dihydrate (stabilized) containing 0.5% calcium glycerophosphate | 47.55 |
| Glycerine U. S. P. | 33.16 |
| Distilled water | 14.32 |
| Gum tragacanth | .20 |
| Gum karaya | .20 |
| A sulfonated organic ester detergent | 3.32 |
| Soluble saccharin | .11 |
| Benzoic acid | .04 |
| Flavor | 1.10 |

ROBERT V. CONNELLY.

REFERENCES CITED

The following references are of record in the file of this patent:

UNITED STATES PATENTS

| Number | Name | Date |
|---|---|---|
| 396,192 | Clark | Jan. 15, 1889 |
| 1,717,723 | McCall | June 18, 1929 |
| 2,216,816 | Kuever | Oct. 8, 1940 |
| 2,287,699 | Moss | June 23, 1942 |

FOREIGN PATENTS

| Number | Country | Date |
|---|---|---|
| 572,352 | Great Britain | Oct. 3, 1945 |
| 4,244 | Great Britain | 1907 |